J. ERMENTRAUT.
WOOD PLANING MACHINE.
APPLICATION FILED APR. 3, 1908.
994,989.
Patented June 13, 1911.
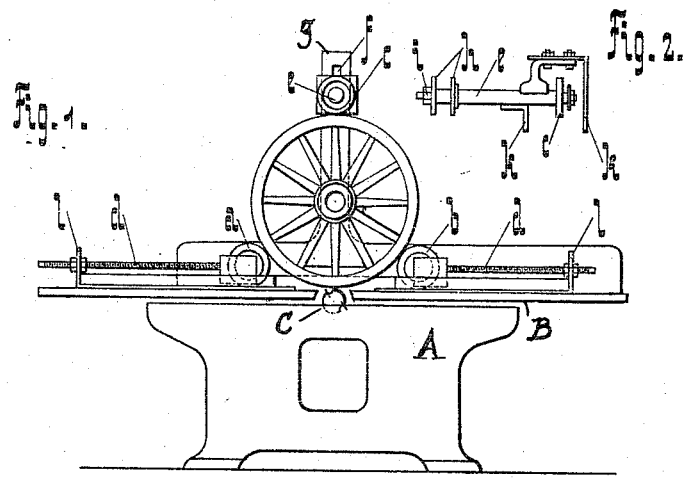

UNITED STATES PATENT OFFICE.

JEAN ERMENTRAUT, OF HÖCHST-ON-THE-MAIN, GERMANY.

WOOD-PLANING MACHINE.

994,989.  Specification of Letters Patent.  Patented June 13, 1911.

Application filed April 3, 1908. Serial No. 424,915.

*To all whom it may concern:*

Be it known that I, JEAN ERMENTRAUT, a citizen of the German Empire, residing at Höchst-on-the-Main, Prussia, Germany, have invented new and useful Improvements in Wood-Planing Machines, of which the following is a specification.

My invention relates to wood planing machines, and its object is to provide means whereby an ordinary flat surface planing machine may be adapted for truing or turning cylindrical or circular bodies such for instance as fellies of carriage or wagon wheels.

For a detailed description of my invention I will refer to the accompanying drawings in which—

Figure 1, is an elevation of a planing machine embodying my invention, Fig. 2 is a detailed view of the upper work supporting roller.

Referring to Fig. 1, A illustrates the frame, B the table and C the rotary cutter of a flat planing machine, which may be of ordinary construction and which need not be more particularly described. On the table B at each side of the cutter C, there is mounted a plate or frame having an upright $l$ in which is adjustably mounted a screw threaded rod $d$, said rod carrying at one end adjacent to the cutter C a pair of plates between which is mounted a work supporting roller, the roller at the left of the cutter being lettered $a$ and the roller at the right of the cutter being lettered $b$. The rods $d$ are rendered adjustable toward and from the cutter C by means of nuts which are screwed on the rods and which operate in conjunction with the uprights $l$, to secure the rods in adjusted position, as clearly shown.

A standard $g$ is mounted on the machine for the purpose of supporting a work supporting roller $c$ above and in line with the cutter C. Said standard is provided with a slot $f$ in which a stud or shaft $e$ is mounted so as to be adjustable toward and from the cutter C. The stud or shaft $e$ is clamped in adjusted position by means of clamping plates $h$ and a nut $i$ which is mounted on the threaded end of said stud, as clearly shown in Fig. 2. Arms $k$, $k$ are adjustably mounted on the stud $e$, one at each side of the roller $c$ to afford lateral supports for the wheel or other body which is to be operated on by the cutter C.

In the operation of the machine, the wheel or other article to be turned or trued, is mounted between the rollers $a$, $b$ and $c$, so as to be supported thereby. Said rollers are then adjusted to bring the article in contact with the cutter. The latter is then rapidly revolved while the wheel is turned or revolved by hand in a direction opposite to the direction of rotation of the cutter. The supporting rollers are adjusted with reference to the cutter as occasion may require, and by this means the work may be accurately and smoothly trued. The work may be revolved by hand, or means may be provided for mechanically turning it as desired.

Having thus described my invention what I claim as new and desire to secure by Letters Patent is:

The combination with the bed and cutter of a flat surface planing machine, of a pair of rollers mounted on the bed, one at each side of and above the cutter, and a third roller mounted above the cutter, all of said rollers being adjustable toward and from the cutter, and being adapted to rotatably support a circular or cylindrical body in operative position to the cutter, substantially as described.

In testimony whereof I have signed my name to this specification in the presence of two subscribing witnesses.

JEAN ERMENTRAUT.

Witnesses:
 JEAN GRUND,
 CARL GRUND.

Copies of this patent may be obtained for five cents each, by addressing the "Commissioner of Patents, Washington, D. C."